United States Patent
Kishan et al.

(10) Patent No.: US 9,600,325 B2
(45) Date of Patent: *Mar. 21, 2017

(54) ONE-TIME INITIALIZATION

(75) Inventors: Arun Kishan, Bellevue, WA (US); Neill M. Clift, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,850

(22) Filed: May 12, 2011

(65) Prior Publication Data

US 2011/0214128 A1   Sep. 1, 2011

Related U.S. Application Data

(63) Continuation of application No. 11/432,888, filed on May 12, 2006, now Pat. No. 7,962,912.

(51) Int. Cl.
 G06F 9/46 (2006.01)
 G06F 9/48 (2006.01)

(52) U.S. Cl.
 CPC .................................. G06F 9/4806 (2013.01)

(58) Field of Classification Search
 CPC .................................................... G06F 9/4806
 See application file for complete search history.

(56) References Cited

U.S. PATENT DOCUMENTS 5,524,209 A * 6/1996 Parker et al. .................... 714/36
5,771,382 A * 6/1998 Wang et al. ................... 718/100
5,852,731 A   12/1998 Wang
5,943,689 A   8/1999  Tamer
6,173,375 B1  1/2001  Arshad
6,567,893 B1  5/2003  Challenger
6,907,503 B2  6/2005  Lindsay
7,216,110 B1 * 5/2007  Ogg et al. ....................... 705/80

(Continued)

OTHER PUBLICATIONS

Lock With a Nonblocking Mutex, Oracle Documentation, Feb. 1, 2002.*

(Continued)

*Primary Examiner* — Benjamin Wu
*Assistant Examiner* — James J Lee
(74) *Attorney, Agent, or Firm* — L. Alan Collins; Collins & Collins Intellectual, LLC

(57) ABSTRACT

Aspects of the present invention are directed at providing safe and efficient ways for a program to perform a one-time initialization of a data item in a multi-threaded environment. In accordance with one embodiment, a method is provided that allows a program to perform a synchronized initialization of a data item that may be accessed by multiple threads. More specifically, the method includes receiving a request to initialize the data item from a current thread. In response to receiving the request, the method determines whether the current thread is the first thread to attempt to initialize the data item. If the current thread is the first thread to attempt to initialize the data item, the method enforces mutual exclusion and blocks other attempts to initialize the data item made by concurrent threads. Then, the current thread is allowed to execute program code provided by the program to initialize the data item.

20 Claims, 3 Drawing Sheets

(56) References Cited

U.S. PATENT DOCUMENTS

| | | | |
|---|---|---|---|
| 7,380,101 B2 | 5/2008 | Wright | |
| 7,729,816 B1 | 6/2010 | Josselson | |
| 8,261,024 B1 | 9/2012 | Shavit | |
| 2002/0196459 A1 | 12/2002 | Kadowaki | |
| 2003/0145035 A1* | 7/2003 | de Bonet | G06F 9/526 718/102 |
| 2004/0205074 A1 | 10/2004 | Berkery | |
| 2005/0273772 A1* | 12/2005 | Matsakis et al. | 717/136 |
| 2006/0031598 A1 | 2/2006 | Blanchard | |
| 2006/0225077 A1* | 10/2006 | Anderson | G06F 9/526 718/104 |
| 2006/0225078 A1* | 10/2006 | Anderson | G06F 9/526 718/104 |
| 2011/0219379 A1 | 9/2011 | Kishan | |

OTHER PUBLICATIONS pthread_mutex_trylock, IBM Documentation, Feb. 1, 2001.*
U.S. Appl. No. 11/432,888, filed May 12, 2006, Kishan.
U.S. Appl. No. 13/106,836, filed May 12, 2011, Kishan.
Birrell, "An Introduction to Programming with Threads", Jan. 6, 1989.
Schmidt, "Double-Checked Locking: An Optimization Pattern for Efficiently Initializing and Accessing Thread-safe Objects", in Pattern Languages of Program Design 3, Oct. 17, 1997.
Bacon, "The "Double-Checked Locking is Broken" Declaration", published on or before Apr. 16, 2004.
"Alpha Architecture Handbook, Chapter 5.6.1.7 Definition of Dependence Constraints", Digital Equipment Corporation, Oct. 1996.
Gharachorloo, "Reordering on an Alpha processor", published on or before Apr. 16, 2004.
Microsoft, "Synchronization and Multiprocessor Issues", published on or before Apr. 16, 2004.
"pthread_once—dynamic package initialization", The Open Group Base Specifications Issue 6, IEEE Std 1003.1, published on or before Apr. 16, 2004.
Pankaj, "Java Singleton Design Pattern Best Practices with Examples", JournalDev, Mar. 3, 2013.
Coffey, "Double-checked Locking (DCL) and how to fix it (ctd)", Published on or before Jan. 25, 2009.

* cited by examiner

ONE-TIME INITIALIZATION

RELATED APPLICATIONS

This Application is a continuation of, and claims priority from, U.S. Pat. No. 7,962,912 filed on May 12, 2006, and incorporated herein by reference in its entirety.

BACKGROUND

A common activity performed by computer programs is to initialize a data item. For example, some high level programming languages are "object oriented" in that functionality of a program may be implemented in objects created from a class. As a program executes, the first time the program uses an object, a function or other program code initializes the object. As used herein, the term "initialize" or "initialization" refers to the process of allocating resources to a data item, such as an object. By way of example only, if a program creates a "file" object, the initialization process may include, but is not limited to, allocating memory to the file object, setting object specific variables, obtaining a file handle used to reference the file object, and the like.

In some instances, the process of initializing a data item, such as an object, is resource intensive. As a result, modern computer systems are typically configured to defer initialization until such time that a program will access the resources allocated to the object. Moreover, once an object has been initialized, information used to access or call the initialized object is "cached" so that subsequent calls to the object may be handled quickly without initialization being repetitively performed.

However, deferring initialization of a data item, such as an object, introduces potential error sources into a program that executes in any multi-threaded environment. In this regard, to overcome the deficiencies associated with previous generations of computers, modern operating systems have been created that are multi-threaded. A thread is the basic unit used by an operating system to allocate processor time and may include any part of a program's code, including parts currently being executed by another thread. Thus, as used herein, "multi-threaded" refers to the technique implemented by modern operating systems to alternate between different parts of a program (e.g., threads). As each thread completes executing, the processor is allocated to another thread. In a computer with one processor, the extraordinary speed of the processor provides the illusion that programs and their associated threads execute simultaneously. Multi-threaded operating systems increase the amount of work a computer system is able to accomplish because most programs do not require that threads continuously execute. For example, periodically, a thread "blocks" or stops executing and waits while a slow resource completes a data transfer or while another thread is using a resource it needs. When one thread must wait, multi-threaded environments allow another thread to execute, thus taking advantage of processor cycles that would otherwise be wasted.

While a multi-threaded operating system allocates resources efficiently, a potential error source arises as two or more threads may be configured to concurrently initialize the same data item (e.g., object). In some systems, a program developer may be required to synchronize the initialization of an object using a synchronization construct such as, but not limited to, a semaphore, condition variable, spinlock, etc. Synchronization constructs provide the ability for one thread to voluntarily stop executing or "sleep" and wait until another thread performs an operation. However, using a synchronization construct requires developers to carefully consider synchronization issues when developing a program. For example, the way in which a synchronization construct is implemented may be dependent on the computer platform in which a program will execute.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at providing safe and efficient ways for a program to perform a one-time initialization of a data item in a multi-threaded environment. In accordance with one embodiment, a method is provided that allows a program to perform a synchronized initialization of a data item that may be modified by multiple threads. More specifically, the method includes receiving a request to initialize the data item from a current thread. In response to receiving the request, the method determines whether the current thread is the first thread to attempt to initialize the data item. If the current thread is the first thread to attempt to initialize the data item, the method enforces mutual exclusion and blocks other attempts to initialize the data item made by concurrent threads. Then, the current thread is allowed to execute program code provided by the program to initialize the data item.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention may be described in the general context of data items that cause computer instructions to be executed. Generally described, a data item may include, but is not limited to, objects, routines, widgets, components, data structures, and the like that perform particular tasks or implement particular abstract data types. Moreover, the present invention may also be practiced in distributed computing environments where tasks are performed by remote processing devices that are linked through a communications network. In a distributed computing environment, data items may be located on local and/or remote computer storage media. The term "computer storage media" as used herein refers to a statutory article of manufacture that is not a signal or carrier wave per se.

While the present invention will primarily be described in the context of using a one-time initialization primitive to synchronize initialization of a data item, those skilled in the relevant art and others will recognize that the present invention is also applicable to other areas than those described. In any event, the following description first provides a general context and system in which aspects of the present invention may be implemented. Then methods that implement aspects of the invention are described. The illustrative examples described herein are not intended to be exhaustive or to limit the invention to the precise forms disclosed. Similarly, any steps described herein may be interchangeable with other steps or combinations of steps in order to achieve the same result.

Figure 1:
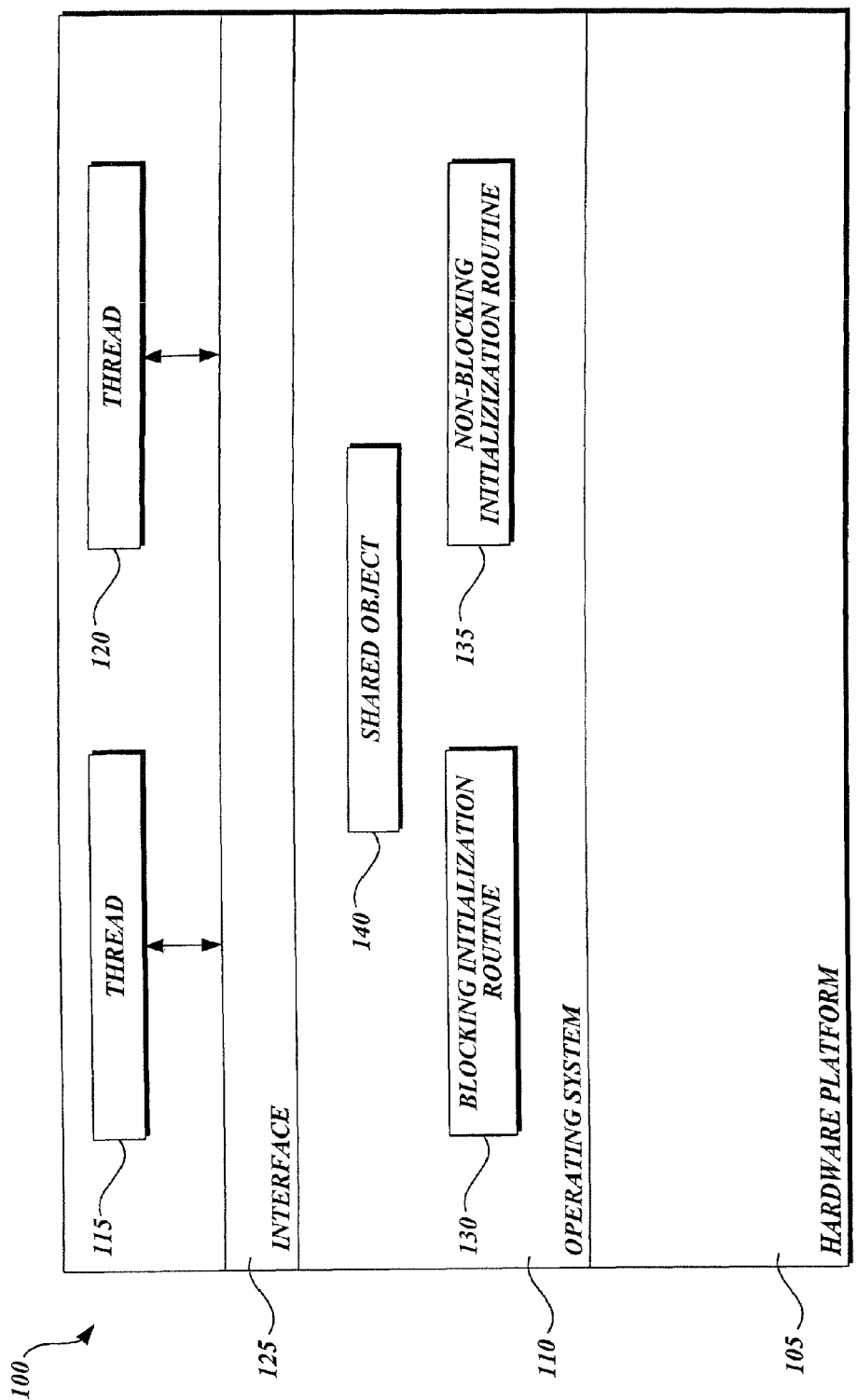
FIG. 1 is an exemplary block diagram of a computer that illustrates a one-time initialization system in which aspects of the present invention may be implemented.

Embodiments of the present invention are operational in numerous general purpose or special purpose computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, distributed computing environments that include any of the above systems or the like. In this regard, FIG. 1 illustrates an exemplary computer 100 with components that collectively provide a one-time initialization system. As illustrated in FIG. 1, the computer 100 includes a hardware platform 105, an operating system 110 that provides services to the threads 115 and 120 via the interface 125. Moreover, in the embodiment illustrated in FIG. 1, the operating system 110 includes a blocking initialization routine 130, a non-blocking initialization routine 135, and a shared object 140. For ease of illustration and because it is not important for an understanding of the present invention, FIG. 1 does not show some typical components of modern computers, such as a memory, processor, keyboard, a mouse, a printer, or other I/O devices, a display, etc.

As illustrated in FIG. 1, the computer 100 includes an operating system 110 that may be a general purpose operating system, such as a Microsoft® operating system, UNIX® operating system, or Linux® operating system. Alternatively, the operating system 110 may be a specialized operating system designed specifically for a computer that maintains non-generic hardware. In any event, the operating system 110 controls the general operation of the computer 100 and is responsible for providing certain core services including, but not limited to, input/output, memory management, thread scheduling, and the like. For example, when the threads 115-120 request resources from the hardware platform 105, the operating system 110 provides services to access the resources. Typically, services provided by the operating system 110 are accessible using the interface 125, which may define a set of callable functions ("APIs").

The threads 115-120 are independent paths of software execution within one or more processes (not illustrated) and may execute concurrently and asynchronously in the computer 100. Multi-threading environments that support concurrent threads of execution imply that certain program tasks may be executed in any order and possibly in parallel. When designing an operating system that supports multi-threading with concurrent threads of execution, it is preferable to avoid any potential data conflicts that may result from multiple attempts to initialize the same data item. In this regard, FIG. 1 depicts a shared object 140 that may be accessed by either of the threads 115 or 120. In accordance with one embodiment, the present invention extends the functionality of the operating system 110 by providing APIs that, among other things, abstract synchronization logic for initializing data items shared by multiple threads 115-120, such as the shared object 140.

A program may issue an API call to the interface 125 for initializing the shared object 140 and obtain data to access the shared object 140. When the API call is received, software components in the operating system 110 may perform an efficient and lightweight initialization of the shared object 140 if initialization of the shared object 140 has not been previously performed. As described in further detail below, by having a trusted software component, such as the operating system 110, synchronize initialization of the shared object 140, the potential for program developers to implement common synchronization errors is avoided.

One aspect of the present invention is a blocking initialization routine 130 that enforces mutual exclusion to initialize a data item. Since the blocking initialization routine 130 is described in further detail below with reference to FIG. 2, a detailed description of the routine 130 will not be provided here. However, generally described, the blocking initialization routine 130 enforces mutual exclusion when causing a one-time initialization of a data item to be performed. In other words, a critical section or code area where the multiple threads 115-120 could execute concurrently to initialize a data item is identified. Then, mutual exclusion is enforced in the critical section through a set of atomic operations that allow a first-in-time thread to start initialization of the shared object 140 as subsequent threads are blocked until the initialization started by the first-in-time thread is complete. Stated differently, the set of atomic operations allows one thread among the multiple threads 115-120 to initialize the shared object 140. Once initialization of the shared object 140 is complete, data that may be used to access the shared object 140 may be returned to all threads that attempt the initialization.

Another aspect of the present invention is a non-blocking initialization routine 135 that initializes a data item without blocking any thread's initialization attempt. Since the non-blocking initialization routine 135 is described in further detail below with reference to FIG. 3, a detailed description of the routine 135 will not be provided here. However, similar to the blocking initialization routine 130, the non-blocking initialization routine 135 may initialize a data item, such as the shared object 140. In this instance, multiple threads 115-120 are allowed to concurrently attempt to initialize the shared object 140 without subsequent threads being blocked until a first-in-time thread completes the initialization. Stated differently, until a first-in-time thread successfully completes the initialization, subsequent threads are not prevented from also attempting the initialization. Once a first-in-time thread successfully completes the initialization, transitions are implemented to prevent subsequent threads from attempting the initialization. Moreover, any thread that attempted the initialization, but was not the first-in-time thread, is returned an indication that the initialization occurred but the current thread's attempt failed so that "clean-up" operations may be performed.

In the embodiment of the computer 100 illustrated in FIG. 1, logic provided by the present invention is implemented in the operating system 110. However, those skilled in the art and others will recognize that the computer architecture described with reference to FIG. 1 is exemplary and should not be construed as limiting. For example, the logic provided by blocking initialization routine 130 and non-blocking initialization routine 135 may be implemented in other contexts without departing from the scope of the claimed subject matter. Generally stated, FIG. 1 is an exemplary depiction of one computer 100 in which aspects of the present invention may be implemented. Actual embodiments of the computer 100 will have additional components not illustrated in FIG. 1 or described in the accompanying text. Moreover, FIG. 1 shows one component architecture for performing a one-time initialization of a data item, but other component architectures are possible.

Now with reference to FIG. 2, an exemplary embodiment of a blocking initialization routine 130 briefly mentioned above with reference to FIG. 1 will be described in further detail. In accordance with one embodiment, the blocking initialization routine 130 is executed each time a thread issues an API call to an operating system for initializing a specified data item in a way that enforces mutual exclusion. For example, in the context of FIG. 1, both of the threads 115 or 120 may concurrently issue an API call to the interface 125 that invokes the blocking initialization routine 130. The blocking initialization routine 130 handles each API call by causing the data item to be initialized and returns initialization information to each calling thread. As described in further detail below, the operations performed by the blocking initialization routine 130 only allow the first-in-time thread to perform a synchronized one-time initialization of the data item, the results of which are reported to other threads that make an initialization attempt.

Figure 2:
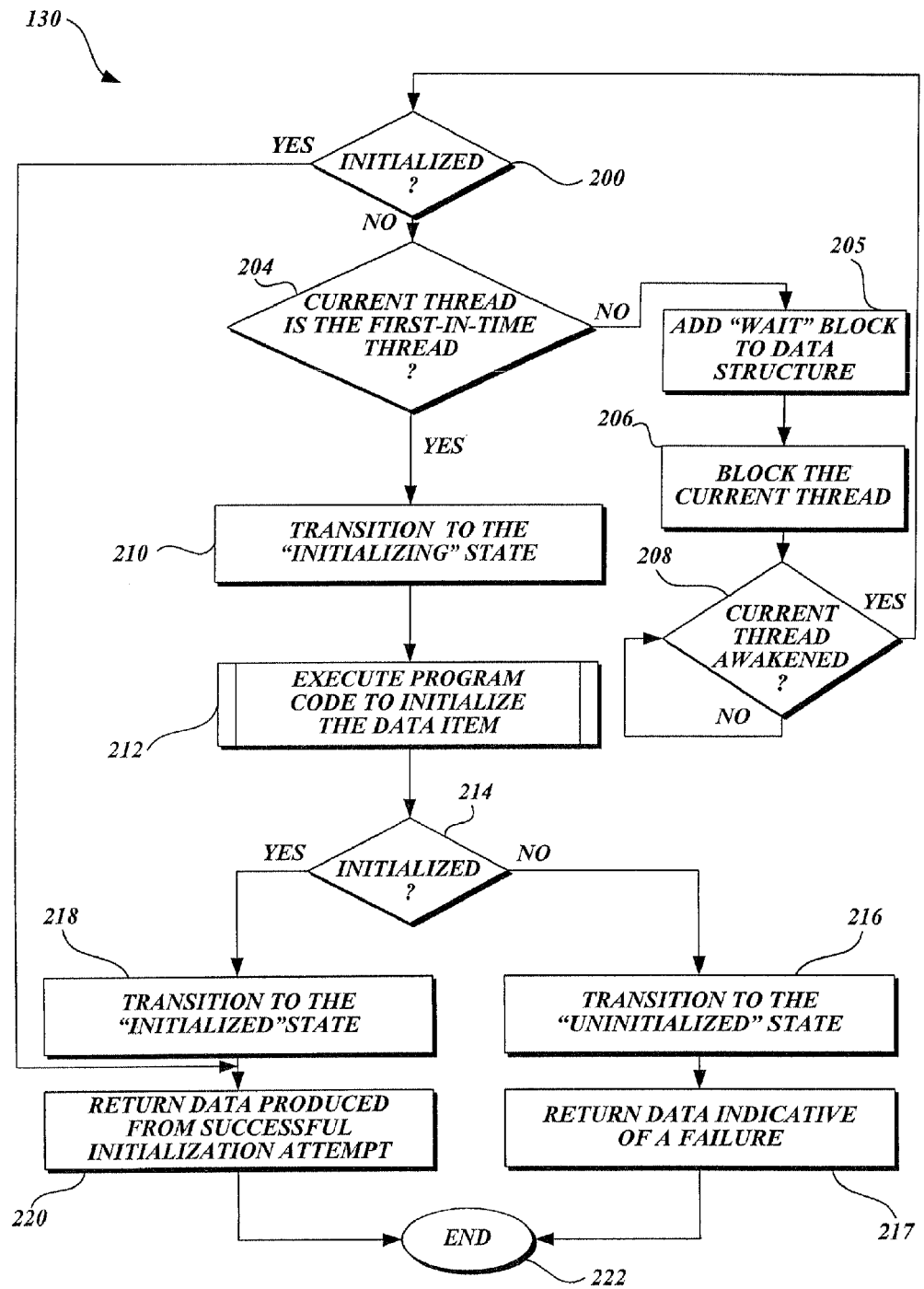
FIG. 2 is a pictorial depiction of an exemplary flow diagram of a blocking initialization routine that initializes a data item in accordance with one embodiment of the present invention.

As illustrated in FIG. 2, the blocking initialization routine 130 begins at decision block 200 where a determination is made regarding whether a specified data item was previously initialized. In accordance with one embodiment, arguments are passed to the blocking initialization routine 130 by a calling program which identifies the specified data item that will be initialized and a callback function or other program code that is configured to perform the initialization.

When an attempt to initialize a data item is initially made, a global variable, hereinafter referred to as a "one-time initialization primitive" is created. In one embodiment, the one-time initialization primitive includes a "two-tuple" of bits used for tracking the initialization state of the data item. When the one-time initialization primitive is created, the initialization state of the data item is set to "uninitialized" by default. As described in further detail below, the two-tuple of bits may be manipulated through a set of atomic operations that transitions a one-time initialization primitive into one of three possible states, including the states of (1) "uninitialized," (2) "initializing" (blocking), or (3) "initialized." By tracking the state of the one-time initialization primitive, the blocking initialization routine 130 may implement functionality that allows a synchronized one-time initialization of the data item to be performed.

At block 200, the blocking initialization routine 130 accesses the one-time initialization primitive allocated to the data item that the current thread is attempting to initialize. As described in further detail below, a first-in-time thread may have previously initialized the data item and transitioned the one-time initialization primitive into the "initialized" state. In this instance, the blocking initialization routine 130 determines that an initialization was previously performed and proceeds to block 220, described in further detail below. Conversely, if the one-time initialization primitive indicates that the specified data item has not reached the "initialized" state, the blocking initialization routine 130 determines that an initialization was not previously performed and proceeds to block 204.

It should be well understood that the one-time initialization primitive may be created and used by the blocking initialization routine 130 either statically at compile-time or dynamically at run-time. For example, in operating systems that support dynamic creation of objects, the one-time initialization primitive may be created as part of a larger object by a dynamic object allocator, such as a structure commonly known as a "heap." Those skilled in the art and others will recognize that allowing the one-time initialization primitive to be created dynamically expands the possible uses of the present invention over existing systems.

At decision block 204, the blocking initialization routine 130 determines whether the current thread is the first-in-time thread that will succeed in causing program code for initializing the data item to be executed. It should be well understood that the current thread's call to the blocking initialization routine 130 may be interrupted in a multithreaded environment, thereby potentially resulting in multiple concurrent attempts to initialize the same data item. Stated differently, the blocking initialization routine 130 has not yet enforced mutual exclusion as a critical section of program code in which only one thread may enter at a time has not yet been reached. As a result, an operating system may interrupt the current thread's attempt to initialize the data item, potentially resulting in a different thread reaching a critical section where mutual exclusion is enforced. As described in further detail below, mutual exclusion is enforced when the one-time initialization primitive transitions to the "initializing" state as only one thread is allowed to transition the one-time initialization primitive to the "initializing" state. Thus, to determine whether the current thread is the first-in-time thread, at block 204, the value of the one-time initialization primitive is identified. If the one-time initialization primitive indicates that the data item is still in the "uninitialized" state, the blocking initialization routine 130 determines that the current thread is the first-in-time thread and proceeds to block 210, described below. Conversely, if the one-time initialization primitive now indicates that the data item has either reached the "initializing" or "initialized" state, the blocking initialization routine 130 determines that the current thread is not the first-in-time thread and proceeds to block 205.

At block 205, a "wait block" associated with the current thread is added to a data structure. If block 205 is reached, the current thread is not the first-in-time thread that will initially attempt to execute the program code for initializing the data item. As each subsequent-in-time thread reaches block 205, a compare and swap operation is performed in which data associated with the previous thread is added to the current thread's stack. As a result, concurrent threads are linked in a data structure that tracks concurrent attempts to initialize the same data item. In this regard and in accordance with one embodiment, entries in the data structure are reverse ordered based on the time when an entry was added to the data structure (e.g., "LIFO"). However, those skilled in the art and others will recognize that a different type of data structure may be used and entries may be linked in other ways without departing from the scope of the claimed subject matter. As described in further detail below, tracking concurrent attempts to initialize the same data item in a data structure, provides a mechanism for the thread that succeeds in initializing the data item to identify and "awaken" threads that are put to "sleep."

As further illustrated in FIG. 1, at block 206 the blocking initialization routine 130 "blocks" the current thread from continuing to execute. If block 206 is reached, the current thread was not identified as the first-in-time thread that will be allowed to initially attempt to initialize the data item. In this instance, the current thread is blocked or put to "sleep" at block 206. As a result, processor time previously allocated to the current thread is available and may be allocated to other threads. Then, at block 208, the blocking initialization routine 130 remains idle until the current thread is "awakened" from sleep. As described in further detail below, once the first-in-time thread has either successfully initialized the data item or failed in the initialization attempt, a thread that was previously put to sleep is awakened. In this instance, the blocking initialization routine 130 proceeds back to block 200 where a determination regarding whether the data item was successfully initialized is made. If the data item was successfully initialized by a different thread, the blocking initialization routine 130 proceeds to block 220, where the results of the successful initialization are returned to the current thread. Conversely, if the data item was not successfully initialized, the current thread may proceed in making another initialization attempt.

At block 210, the blocking initialization routine 130 transitions the initialization state of the data item into the "initializing" (blocking) state. If block 210 is reached, the current thread was identified as the first-in-time thread that will initially attempt to initialize the data item. In this instance, the value of the two-tuple of bits in the one-time initialization primitive is modified, at block 210, to reflect that the current thread's initialization attempt is proceeding. As a result, the blocking initialization routine 130 is now enforcing mutual exclusion so that only one thread may proceed to block 212 and execute program code to initialize the data item. Stated differently, subsequent threads that reach block 204 (described above) will now determine that they are not the first-in-time thread since the one-time initialization primitive is now in the state of "initializing." As mentioned previously, these subsequent threads will block, thereby resulting in mutual exclusion in the critical code section (block 212). It should be noted that the implementation of the blocking initialization routine 130 described herein enforces mutual exclusion without relying on a synchronization construct, such as an internal locking mechanism. As a result, aspects of the present invention provide a streamlined initialization mechanism that abstracts synchronization issues from developers. Moreover, the initialization mechanism provided by the present invention is optimized for the initialization scenario to use only a pointer-sized variable (e.g., the one-time initialization primitive), thereby minimizing the use of computer resources.

As illustrated in FIG. 1, at block 212, the blocking initialization routine 130 causes program code that initializes the data item to be executed. As mentioned previously and in accordance with one embodiment, an argument known as a callback function may be passed to the blocking initialization routine 130 when the appropriate API call is made. The callback function identifies the function or other program code provided by the calling program that is configured to initialize the data item. In this example, the blocking initialization routine 130 causes the data item to be initialized, at block 212, by branching program execution to the callback function that was received when the API call was made. However, those skilled in the art will recognize that program code for initializing the data item may be called using other mechanisms without departing from the scope of the claimed subject matter.

The callback function may be configured to return data to the blocking initialization routine 130. For example, if the data item initialized is a "file" object, the callback function may return a file handle to the blocking initialization routine 130 that was allocated by an operating system to access the file object. In one embodiment, the data capable of being returned to the blocking initialization routine 130 is a variable capable of storing any data format. Thus, the memory overhead used by the present invention to synchronize initialization of a data item is small. It should be well understood that the callback function is not required to return any data to the blocking initialization routine 130. In accordance with one embodiment, the data returned is stored in the one-time initialization primitive along with the "two-tuple" of bits. As described in further detail below, the data returned by the callback function that is stored in a one-time initialization primitive will be returned to each thread that attempts to initialize the data item.

At decision block 214, a determination is made regarding whether the specified data item was successfully initialized. Stated differently, a determination is made, at block 214, regarding whether the program code that is configured to initialize the data item was successfully executed, at block 212. Those skilled in the art and others will recognize that program code for initializing a data item may fail for any number of different reasons. In one embodiment, if data is returned from the callback function that is indicative of a failure, the result of the test performed at block 214 is "NO" and the blocking initialization routine 130 proceeds to block 216. Conversely, if the data item was successfully initialized, the result of the test performed at block 214 is "YES" and the blocking initialization routine 130 proceeds to block 218, described in further detail below.

At block 216, the blocking initialization routine 130 transitions the current thread from the "initializing" (blocking) state into the "uninitialized" state by modifying the two-tuple of bits in the one-time initialization primitive allocated to the current thread. By changing the state of the current thread's initialization attempt, mutual exclusion is no longer enforced. As a result, threads that were previously blocked by being put to sleep are awakened and may proceed in attempting to initialize the data item. More specifically, the operating system receives notice of the state transition and traverses the data structure in which concurrent threads are represented. In one embodiment, each concurrent thread represented in the data structure of linked "wait" blocks is awakened and proceeds to block 200, where a determination is made regarding whether the data item has been successfully initialized.

In the embodiment illustrated in FIG. 1, the blocking initialization routine 130 is configured to then proceed to block 217 where data is returned to the current thread that indicates the initialization attempt failed. When a calling thread receives an indicator of an initialization failure, any number of different actions may be performed in response to the failure. For example, and as mentioned previously, other initialization attempts may be made by other concurrent threads. In another embodiment, a program may merely handle the failure to prevent error conditions. In this instance, information may be passed to the operating system that indicates the first-in-time initialization attempt succeeded. However, concurrent threads that are blocking may be passed information that prohibits the concurrent threads from proceeding in attempting to initialize the data item. As a result, the concurrent threads are awakened but additional initialization attempts are not made.

At block 218, the blocking initialization routine 130 transitions the current thread from the "initializing" (blocking) state into the "initialized" state by modifying the two-tuple of bits in the one-time initialization primitive. Then the blocking initialization routine 130 proceeds to block 220, described below. As a result of changing the state of the current thread's initialization attempt (at block 218), mutual exclusion is no longer enforced and threads that were previously put to sleep are awakened. As mentioned previously, the threads that are awakened may proceed back to block 200 from block 208 where those threads may determine that the data item has been initialized. Moreover, any other initialization attempts made by subsequent threads will also determine that the data item has been successfully initialized when block 200 is reached. These subsequent threads will then proceed to block 220, where the results of the successful initialization attempt are returned.

At block 220, data is returned to the current thread that includes the results produced by the successful initialization attempt. In one embodiment, the blocking initialization routine 130 is executed in response to an API call. At block 220, data is returned to the current thread where the API call was generated that indicates the data item was successfully initialized. Moreover, any data stored in the one-time initialization primitive allocated to the thread that was successful in initializing the data item is returned to all threads. As a result, all threads receive data that may be used to access the initialized data item, even though the current thread may or may not have been the thread that was successful in causing the data item to be initialized. Then, the blocking initiation routine 130 proceeds to block 222, where it terminates.

Now with reference to FIG. 3, an exemplary embodiment of a non-blocking initialization routine 135 briefly mentioned above with reference to FIG. 1 will be described in further detail. In accordance with one embodiment, the non-blocking initialization routine 135 is executed each time a thread issues an API call that attempts to initialize a specified data item in a way that prevents any thread from being "blocked." For example, in the context of FIG. 1, both of the threads 115 or 120 may issue an API call to the interface 125 that invokes the non-blocking initialization routine 135. In response, each API call is handled by a set of operations that allows concurrent threads to initialize the same data item. As described in further detail below, when concurrent threads initialize the same data item, each is returned data obtained as a result of the first-in-time initialization. However, concurrent but subsequent-in-time threads are also returned data that indicates their initialization did not succeed so that "clean up" operations may be performed. Those skilled in the art and others will recognize that robustness is added to operating system if an API is available to initialize a data item without blocking a concurrent thread's attempt to initialize the same data item. For example, certain real-time systems may not allow a thread to be put to sleep when an attempt to complete a task is made.

Figure 3:
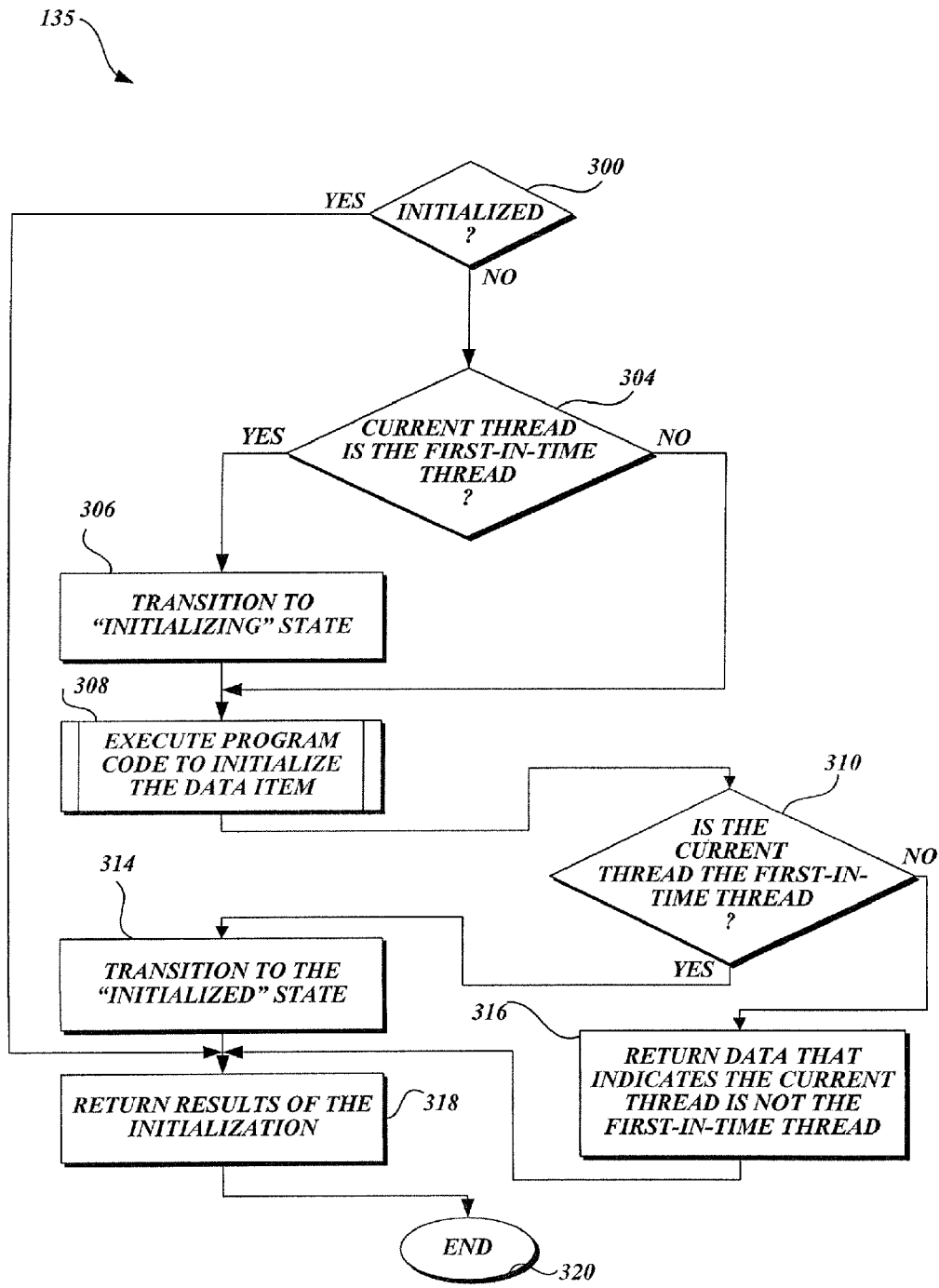
FIG. 3 is a pictorial depiction of an exemplary flow diagram of a non-blocking initialization routine that initializes a data item in accordance with another embodiment of the present invention.

As illustrated in FIG. 3, the non-blocking initialization routine 135 begins at decision block 300 where a determination is made regarding whether a specified data item was previously initialized. Similar to the description provided above with reference to FIG. 2, arguments are passed to the non-blocking initialization routine 135 by a calling program which identifies the specified data item that will be initialized and a callback function or other program code that is configured to perform the initialization Similar to the description provided above with reference to FIG. 2, when an attempt to initialize a data item using the non-blocking initialization routine 135 is initially made, a one-time initialization primitive is created. In one embodiment, the one-time initialization primitive includes a two-tuple of bits for tracking the initialization state of the data item. When block 300 is initially reached, the one-time initialization primitive is set to "uninitialized" by default. As described in further detail below, the two-tuple of bits may be manipulated to transition the initialization state of a data item into one of three possible states, including the states of (1) "uninitialized," (2) "initializing" (non-blocking), or (3) "initialized." By tracking the initialization state of the data item, the non-blocking initialization routine 135 may implement functionality that allows a non-blocking initialization of the data item to be performed.

At block 300, the non-blocking initialization routine 135, accesses the one-time initialization primitive associated with the data item that the current thread is attempting to initialize. As described in further detail below, a first-in-time thread may have previously initialized the data item and transitioned the one-time initialization primitive into the "initialized" state. In this instance, the non-blocking initialization routine 135 determines that an initialization was previously performed and proceeds to block 318, described in further detail below. Conversely, if the one-time initialization primitive indicates that the data item has not reached the "initialized" state, the non-blocking initialization routine 135 determines that an initialization was not previously performed and proceeds to block 304.

At decision block 304, a determination is made regarding whether the current thread is the first thread to attempt to initialize the data item. The operating system may interrupt the current thread's attempt to initialize the data item, potentially resulting in multiple concurrent initialization attempts. However, unlike the blocking initialization routine 130 (FIG. 2) described above, the non-blocking initialization routine 135 does not enforce mutual exclusion when initializing a data item. Instead, multiple initialization attempts are allowed to proceed in parallel with subsequent-in-time threads receiving results obtained by the first-in-time thread. However, only the first-in-time thread is allowed to transition the one-time initialization primitive to the "initializing" state (non-blocking) and ultimately to the "initialized" state. Thus, to determine whether the current thread is the first-in-time thread, at block 304, the value of the one-time initialization primitive is identified. If the one-time initialization primitive indicates that the data item is still in the "uninitialized" state, the non-blocking initialization routine 135 determines that the current thread is the first-in-time thread and proceeds to block 306, described below. Conversely, if the one-time initialization primitive indicates that the data item has either reached the "initializing" or "initialized" state, the non-blocking initialization routine 135 determines that the current thread is not the first-in-time thread and proceeds to block 308.

At block 306, the non-blocking initialization routine 135 transitions the current thread into the "initializing" (non-blocking) state. If block 306 is reached, the current thread was identified as the first-in-time thread. In this instance, the value of the two-tuple of bits in the one-time initialization primitive is modified, at block 306, to reflect that the current thread is entering the "initializing" (non-blocking) state. However, as mentioned previously, changing the state of the first-in-time thread to the "initializing" (non-blocking) state does not prevent other concurrent threads from proceeding to attempt to initialize the data item.

As illustrated in FIG. 3, at block 308, the non-blocking initialization routine 135 causes program code that initializes the data item to be executed. Similar to the description provided above with reference to FIG. 2, an argument known as a callback function may be passed to the non-blocking initialization routine 135 when the appropriate API call is made. The callback function identifies the function or other program code provided by the calling program that is configured to initialize the data item. In this example, the non-blocking initialization routine 135 causes the data item to be initialized, at block 308, by branching program execution to the callback function or other program code that was identified when the API call was made. When execution is complete, the callback function may or may not return data to the non-blocking initialization routine 135. Similar to the description provided above with reference to FIG. 2, the data returned may be stored in the one-time initialization primitive along with the state information. As mentioned previously, the non-blocking initialization routine 135 does not block a concurrent but duplicative attempt to initialize a data item. Thus, multiple concurrent threads may reach block 308 and cause the data item to be initialized.

At decision block 310, a determination is made regarding whether the current thread was the first-in-time thread that successfully initialized the data item. As described in further detail below, the first-in-time thread transitions the one-time initialization primitive from the "initializing" (blocking) state into the "initialized" state. Thus, at block 310 the non-blocking initialization routine 135, accesses the one-time initialization primitive associated with the data item. If, the one-time initialization primitive was previously transitioned into the "initialized" state, the non-blocking initialization routine 135 determines that an initialization was previously performed and proceeds to block 316. Conversely, if the one-time initialization primitive indicates that the data item has not reached the "initialized" state, the non-blocking initialization routine 135 determines that the current thread is the first thread to successfully complete initialization and proceeds to block 314.

At block 314, the blocking initialization routine 135 transitions the current thread from the "initializing" (blocking) state into the "initialized" state by modifying the two-tuple of bits in the one-time initialization primitive. By changing the state of the one-time initialization primitive, subsequent threads that reach decision block 300 proceed directly to block 318 where results of the initialization performed by the current thread are returned. Moreover, by changing the state of the one-time initialization primitive to "initialized," threads that reach decision block 310, make a determination that initialization was previously completed and proceed to block 316.

At block 316, data is returned to the current thread that indicates the initialization performed at block 308 was not the first successful initialization of the data item. Those skilled in the art and others recognize that certain resources may be allocated to a thread when an attempt to initialize a data item is made. As mentioned previously, if block 316 is reached, the current thread is not the first-in-time thread that successfully completed the initialization of the data item. In this instance, the current thread may need to discard any allocated resources. Thus, the non-blocking initialization routine 135 returns data to the current thread that indicates the initialization performed at block 308 was not the first successful initialization of the data item so that these types of "clean-up" operations may be performed.

At block 318, data is returned to the current thread that includes the results produced by the successful initialization that was identified as being the first-in-time. In one embodiment, the non-blocking initialization routine 135 is executed in response to an API call. At block 318, data is returned to the current thread where the call originated that indicates the data item was successfully initialized. Moreover, any data stored in the one-time initialization primitive allocated to the first-in-time thread is also returned. As a result, the current thread receives data that may be used to access the initialized data item. Then the non-blocking initialization routine 135 proceeds to block 320, where it terminates.

While illustrative embodiments have been illustrated and described, it will be appreciated that various changes can be made therein without departing from the spirit and scope of the invention.

The invention claimed is:

1. A non-blocking method performed on a computer that includes at least one processor and memory, the non-blocking method for initializing data, the non-blocking method comprising:
   creating, by the computer prior to an attempt by a first-in-time thread to initialize the data, an initialization primitive that is configured for indicating each of three states of the data, the three states comprising: uninitialized, initializing, and initialized;
   allowing, in response to the attempt to initialize the data and to the initialization primitive indicating that the data is in the uninitialized state, continued execution of the first-in-time thread that is one of a plurality of threads all being concurrently executed by the at least one processor, where the data is shared among the plurality of threads; and
   transitioning, based on the allowing, the initialization primitive to indicate that the data is in the initializing state, where the non-blocking method does not enforce mutual exclusion during the initializing state among any other threads of the plurality of threads that are not the first-in-time thread and that also attempt to initialize the data, and where the any other threads are returned an indication that they did not perform the first successful initialization of the data.

2. The non-blocking method of claim 1, the creating further comprising setting the initialization primitive to indicate that the data is in the uninitialized state.

3. The non-blocking method of claim 2, further comprising:
   determining, in response to the current thread attempting to initialize the data, that the initialization primitive indicates the data is in the uninitialized state, where the current thread is one of the plurality of threads;
   designating, in response to the determining, the current thread as the first-in-time thread that is first among all the plurality of threads to attempt to initialize the data without being interrupted by another of the plurality of threads.

4. The non-blocking method of claim 1, further comprising further allowing, based on the initialization primitive indicating that the data is in the initializing state, continued execution of the any other threads of the plurality of threads.

5. The non-blocking method of claim 3, further comprising executing, while the initialization primitive indicates that the data is in the initializing state, code configured for initializing the data in response to each of the any of the plurality of threads attempting to initialize the data, including the first-in-time thread and the any other threads.

6. The non-blocking method of claim 5, further comprising:
   next determining that the executing the code configured for initializing the data was in response to the first-in-time thread attempting to initialize the data; and
   setting, in response to the first-in-time thread attempting to initialize the data succeeding, the initialization primitive to indicate that the data is in the initialized state.

7. The non-blocking method of claim 5, further comprising:

next determining that the executing the code configured for initializing the data was in response to the first-in-time thread attempting to initialize the data; and setting, in response to the first-in-time thread attempting to initialize the data not succeeding, the initialization primitive to indicate that the data is in the uninitialized state.

8. At least one computer storage media storing computer-executable instructions that, when executed by a computer that includes at least one processor and memory, cause the computer to perform a non-blocking method for initializing data, the non-blocking method comprising:

creating, by the computer prior to an attempt by a first-in-time thread to initialize the data, an initialization primitive that is configured for indicating each of three states of the data, the three states comprising: uninitialized, initializing, and initialized;

allowing, in response to the attempt to initialize the data and to the initialization primitive indicating that the data is in the uninitialized state, continued execution of the first-in-time thread that is one of a plurality of threads all being concurrently executed by the at least one processor, where the data is shared among the plurality of threads; and transitioning, based on the allowing, the initialization primitive to indicate that the data is in the initializing state, where the non-blocking method does not enforce mutual exclusion during the initializing state among any other threads of the plurality of threads that are not the first-in-time thread and that also attempt to initialize the data, and where the any other threads are returned an indication that they did not perform the first successful initialization of the data.

9. The at least one computer storage media of claim 8, the creating further comprising setting the initialization primitive to indicate that the data is in the uninitialized state.

10. The at least one computer storage media of claim 9, the non-blocking method further comprising:

determining, in response to the current thread attempting to initialize the data, that the initialization primitive indicates the data is in the uninitialized state, where the current thread is one of the plurality of threads;

designating, in response to the determining, the current thread as the first-in-time thread that is first among all the plurality of threads to attempt to initialize the data without being interrupted by another of the plurality of threads.

11. The at least one computer storage media of claim 8, the non-blocking method further comprising further allowing, based on the initialization primitive indicating that the data is in the initializing state, continued execution of the any other threads of the plurality of threads.

12. The at least one computer storage media of claim 10, the non-blocking method further comprising executing, while the initialization primitive indicates that the data is in the initializing state, code configured for initializing the data in response to each of the any of the plurality of threads attempting to initialize the data, including the first-in-time thread and the any other threads.

13. The at least one computer storage media of claim 12, the non-blocking method further comprising:

next determining that the executing the code configured for initializing the data was in response to the first-in-time thread attempting to initialize the data; and setting, in response to the first-in-time thread attempting to initialize the data succeeding, the initialization primitive to indicate that the data is in the initialized state.

14. The at least one computer storage media of claim 12, the non-blocking method further comprising:

next determining that the executing the code configured for initializing the data was in response to the first-in-time thread attempting to initialize the data; and setting, in response to the first-in-time thread attempting to initialize the data not succeeding, the initialization primitive to indicate that the data is in the uninitialized state.

15. A system comprising at least one computing device, including a computer, and at least one program that are together configured for performing a non-blocking method for initializing data in a multi-threaded environment, the computer including at least one processor and memory, the non-blocking method comprising:

creating, by the computer prior to an attempt by a first-in-time thread to initialize the data, an initialization primitive that is configured for indicating each of three states of the data, the three states comprising: uninitialized, initializing, and initialized;

allowing, in response to the attempt to initialize the data and to the initialization primitive indicating that the data is in the uninitialized state, continued execution of the first-in-time thread that is one of a plurality of threads all being concurrently executed by the at least one processor, where the data is shared among the plurality of threads; and transitioning, based on the allowing, the initialization primitive to indicate that the data is in the initializing state, where the non-blocking method does not enforce mutual exclusion during the initializing state among any other threads of the plurality of threads that are not the first-in-time thread and that also attempt to initialize the data, and where the any other threads are returned an indication that they did not perform the first successful initialization of the data.

16. The system of claim 15, where the creating further comprises setting the initialization primitive to indicate that the data is in the uninitialized state.

17. The system of claim 16, the non-blocking method further comprising:

determining, in response to the current thread attempting to initialize the data, that the initialization primitive indicates the data is in the uninitialized state, where the current thread is one of the plurality of threads;

designating, in response to the determining, the current thread as the first-in-time thread that is first among all the plurality of threads to attempt to initialize the data without being interrupted by another of the plurality of threads.

18. The system of claim 15, the non-blocking method further comprising further allowing, based on the initialization primitive indicating that the data is in the initializing state, continued execution of the any other threads of the plurality of threads.

19. The system of claim 17, the non-blocking method further comprising executing, while the initialization primitive indicates that the data is in the initializing state, code configured for initializing the data in response to each of the any of the plurality of threads attempting to initialize the data, including the first-in-time thread and the any other threads.

20. The system of claim 18, the non-blocking method further comprising:
- next determining that the executing the code configured for initializing the data was in response to the first-in-time thread attempting to initialize the data;
- setting, in response to the first-in-time thread attempting to initialize the data succeeding, the initialization primitive to indicate that the data is in the initialized state; and
- setting, in response to the first-in-time thread attempting to initialize the data not succeeding, the initialization primitive to indicate that the data is in the uninitialized state.

\* \* \* \* \*